(12) United States Patent
Fujita et al.

(10) Patent No.: US 7,760,489 B2
(45) Date of Patent: Jul. 20, 2010

(54) SOLID ELECTROLYTIC CAPACITOR AND METHOD OF MANUFACTURING THE SAME

(75) Inventors: Masayuki Fujita, Kyoto (JP); Takashi Umemoto, Hirakata (JP); Hiroshi Nonoue, Hirakata (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 112 days.

(21) Appl. No.: 12/053,661

(22) Filed: Mar. 24, 2008

(65) Prior Publication Data

US 2008/0239631 A1  Oct. 2, 2008

(30) Foreign Application Priority Data

Mar. 28, 2007  (JP) .............................. 2007-083268

(51) Int. Cl.
*H01G 9/04* (2006.01)
*H01G 9/145* (2006.01)
(52) U.S. Cl. ..................... 361/528; 29/25.03
(58) Field of Classification Search ......... 361/528–529, 361/523; 29/25.03
See application file for complete search history.

(56) References Cited

U.S. PATENT DOCUMENTS

| 4,468,719 | A  | * | 8/1984 | Shimizu et al. ............. 361/529 |
| 6,351,371 | B1 | * | 2/2002 | Yoshida et al. ............. 361/528 |
| 6,515,848 | B1 | * | 2/2003 | Yoshida et al. ............. 361/525 |
| 7,066,975 | B2 | * | 6/2006 | Oda et al. ..................... 75/244 |

FOREIGN PATENT DOCUMENTS

| JP | 11-012601 A1 | 1/1999 |
| JP | 2003-213302 A1 | 7/2003 |
| JP | 2003-338433 A1 | 11/2003 |
| JP | 2004-014667 A1 | 1/2004 |

* cited by examiner

*Primary Examiner*—Eric Thomas
(74) *Attorney, Agent, or Firm*—Marvin A. Motsenbocker; Mots Law, PLLC

(57) ABSTRACT

The solid electrolytic capacitor includes an anode body formed of a sintered body consisting of metal particles; a dielectric layer provided on the top surface of the anode body; and a conducting polymer layer provided on the top surface of the dielectric layer. The anode body includes a first anode portion and a second anode portion which is provided in a way that the second anode portion covers the first anode portion, and in that the particle diameter of metal particles for the second anode portion is smaller than that of metal particles for the first anode portion.

18 Claims, 7 Drawing Sheets

FIG. 8

| | FIRST ANODE PORTION | | SECOND ANODE PORTION | | THIRD ANODE PORTION | | PARTICLE DIAMETER RATIO | AVERAGE ESR | AVERAGE CAPACITY | RELATIVE CAPACITY |
|---|---|---|---|---|---|---|---|---|---|---|
| | PARTICLE DIAMETER (μm) | SIZE (mm) | PARTICLE DIAMETER (μm) | SIZE (mm) | PARTICLE DIAMETER (μm) | SIZE (mm) | FIRST TO SECOND | (mΩ) | $C_M$ (μF) | (COMPARED WITH COMPARATIVE EXAMPLE 1) |
| EXAMPLE 1 | 0.45 | 4.0x2.5x0.8 | 0.20 | 4.5x3.3x1.0 | - | - | 2.25 | 15 | 305 | 1.36 |
| EXAMPLE 2 | 0.45 | 4.0x2.5x0.8 | 0.30 | 4.5x3.3x1.0 | - | - | 1.50 | 16 | 295 | 1.31 |
| EXAMPLE 3 | 0.45 | 4.0x2.5x0.8 | 0.35 | 4.5x3.3x1.0 | - | - | 1.29 | 18 | 283 | 1.26 |
| EXAMPLE 4 | 0.35 | 4.0x2.5x0.8 | 0.20 | 4.5x3.3x1.0 | - | - | 1.75 | 17 | 294 | 1.31 |
| EXAMPLE 5 | 0.35 | 4.0x2.5x0.8 | 0.30 | 4.5x3.3x1.0 | - | - | 1.17 | 21 | 285 | 1.27 |
| EXAMPLE 6 | 0.30 | 4.0x2.5x0.8 | 0.20 | 4.5x3.3x1.0 | - | - | 1.50 | 23 | 290 | 1.29 |
| EXAMPLE 7 | 0.45 | 3.5x2.2x0.7 | 0.30 | 4.0x2.5x0.8 | 0.20 | 4.5x3.3x1.0 | 1.50 (FIRST TO SECOND) 1.50 (SECOND TO THIRD) | 11 | 300 | 1.33 |
| COMPARATIVE EXAMPLE 1 | 0.20 | 4.5x3.3x1.0 | - | - | - | - | - | 32 | 225 | 1.00 |
| COMPARATIVE EXAMPLE 2 | 0.45 | 4.5x3.3x1.0 | - | - | - | - | - | 25 | 170 | 0.76 |

SOLID ELECTROLYTIC CAPACITOR AND METHOD OF MANUFACTURING THE SAME

CROSS REFERENCE TO RELATED APPLICATIONS

This application claims priority based on 35 USC 119 from prior Japanese Patent Application No. P2007-083268 filed on Mar. 28, 2007, the entire contents of which are incorporated herein by reference.

BACKGROUND OF THE INVENTION

1. Field of the Invention

The present invention relates to a solid electrolytic capacitor having a smaller equivalent series resistance.

2. Description of Related Art

Solid electrolytic capacitors exhibit good high-frequency characteristics, and have a large capacity although small in size. For this reason, the solid electrolytic capacitors are widely used for power supply circuits of various electronic appliances including personal computers and imaging devices. In addition, the emergence of higher-performance mobile appliances typified by cellular phones and potable music players demands smaller-sized capacitors with a larger capacity.

FIGS. 5A to 5C show cross-sectional structural diagrams of a solid electrolytic capacitor of related art. FIG. 5A is a cross-sectional view of the conventional type of solid electrolytic capacitor 1. FIG. 5B is a cross-sectional view of solid electrolytic capacitor 1 taken along the B-B line of FIG. 5A. FIG. 5C is a cross-sectional view of solid electrolytic capacitor 1 taken along the C-C line of FIG. 5C. An anode body, a dielectric layer and a conducting polymer layer are formed around anode lead 2. FIG. 7 shows a schematic diagram of an enlarged cross-section of the anode body. Anode body 3 is formed around anode lead 2. Anode body 3 is fabricated by sintering particles of valve metals including tantalum, niobium, titanium and aluminum, into a cuboid shape.

Dielectric layer 4 is formed on each surface of anode body 3 and anode lead 2. Dielectric layer 4 is formed thereon through oxidizing each surface of anode body 3 and anode lead 2, for example, by anodic oxidation process. After an oxidant is applied to the top of dielectric layer 4, solid electrolyte layer 5 made of a conducting polymer such as polypyrrole, polyaniline or the like is formed in a way that dielectric layer 4 is covered with solid electrolyte layer 5, and in a way that spaces are embedded with solid electrolyte layer 5.

Carbon layer 6 and silver layer 7 are formed on the top surface of solid electrolyte layer 5. Plate-shaped anode terminal 1 is connected to anode lead 2, whereas plate-shaped cathode terminal 8 is connected to silver layer 7.

Outer package 9 is formed in a cuboid shape in order to accommodate anode lead 2, anode body 3, dielectric layer 4, solid electrolyte layer 5, carbon layer 6 and silver layer 7. Outer package 9 is fabricated, for example, of an epoxy resin. Anode terminal 1 and cathode terminal 8 are drawn out of outer package 9, and extend in the mutually different directions, and as well as are bent downwards. Each extremity of these terminals is arranged along the bottom surface of outer package 9, and is used to electrically connect the solid electrolytic capacitor to a mount substrate. This type of solid electrolytic capacitor is disclosed, for example, in Japanese Patent Application Laid-Open publication No. 2004-14667.

For the purpose of causing a solid electrolytic capacitor to have a larger capacity, generally adopted is a method involving increasing the surface area of a sintered body, which is going to be used as the anode body, and which is obtained by sintering metal particles made of a valve metal or its alloy around the anode lead. A method of increasing the surface area of the sintered body includes making particles of the sintered metal or alloy smaller in diameter so as to increase the bonding density among the particles. However, when particles of a metal or alloy to be used for the sintering process are made smaller in diameter, the smaller particle diameter brings about a problem of increasing the equivalent series resistance (ESR) of the solid electrolytic capacitor.

SUMMARY OF THE INVENTION

The inventors have carefully examined why the smaller particle diameter increases the equivalent series resistance of the solid electrolytic capacitor. The followings are new findings from our careful examination. In a case where particles of a metal or alloy to be used for the sintering process are made smaller in diameter, the smaller particle diameter increases contacts among metal particles. The increased contacts increase the electrical resistance inside the sintered body. In addition, because the smaller particle diameter narrows down spaces among the metal particles, this narrowness decreases the film thickness of the conducting polymer layer as the electrolytic layer formed among the metal particles. In this manner, when the particles of the metal or alloy to be used for the sintering process are made smaller in diameter, the smaller particle diameter increases the electrical resistance.

For the purpose of solving the foregoing problem, a solid electrolytic capacitor provides a structure including a thicker conducting polymer layer which is formed among metal particles by making larger the metal particles inside the anode body and achieves a lower electrical resistance. Further provided is a structure where the spaces among the metal particles in the outer periphery of the anode body are narrowed. Narrowing the spaces checks the oxidant from drying unevenly between the inside and the outer periphery of the anode body, in an oxidant adhering and drying process employed while monomers for conducting polymer are being polymerized. As a result, the adhesive properties and a coverage factor of the conducting polymer inside the anode body is improved.

An aspect of the invention provides a solid electrolytic capacitor that comprises: an anode body comprising a first anode portion including a sintered body made of metal particles, and a second anode portion provided in a way that the second anode portion covers the first anode portion, with the particle diameter of metal particles for the second anode portion being smaller than that of the metal particles for the first anode portion; a dielectric layer provided on the top surface of the anode body; and a conducting polymer layer provided on the top surface of the dielectric layer.

This configuration makes spaces among the metal particles inside the anode body larger than those among the metal particles in the outer periphery of the anode body. It is accordingly possible to form the conducting polymer layer thicker to enlarge the space in which the conducting polymer layer is formed larger inside the anode body.

In this respect, the second anode portion does not necessarily cover the entire first anode portion. It suffices if the second anode portion is so arranged in the outer periphery of the first anode portion that a sufficient amount of monomers for the conducting polymer can be supplied to the inside of the anode body. For example, it is sufficient that the second anode portion cover equal to or more than 80% of the first anode portion.

In this respect, the two anode portions inside the anode body are areas each formed of metal particles with an almost equal particle diameter. In a case where metal particles with different particle diameters are mixed together across the two anode portions, the two anode portions may overlap each other in the mixed area.

In addition, once dried up, the oxidant adhered to the top surface of the dielectric layer for the purpose of polymerizing the monomers for the conducting polymer layer does not accelerate the polymerization process anymore. With this taken into consideration, it is idealistic that the polymerization process be subsequently applied to the monomers for the conducting polymer layer in the anode body, which is dipped in an oxidant solution after the dielectric layer is formed on the top surface thereof. Here the top surface of the dielectric layer is desirable to still remain wet with the oxidant solution, whereas the anode body being dried to an extent that the spaces among the metal particles are not filled with the oxidant solution. However, if the particle diameter of the metal particles inside the anode body is equal to that of the metal particles in the outer periphery of the anode body, the outer periphery becomes dry earlier than the inside. As a result, it is likelihood that the outer periphery of the anode body may be wet with the oxidant solution to an appropriate extent whereas the spaces among the metal particles inside the anode body are completely filled with the oxidant solution. If the polymerization process starts to be applied to the monomers with the spaces among the metal particles inside the anode body being filled with the oxidant solution, the conducting polymer layer is not sufficiently formed inside the anode body. This makes conducting polymer layer being formed inside the anode body thinner, and the coverage factor reduced.

Against the foregoing background, if the spaces among the metal particles inside the anode body are made larger than those among the metal particles in the outer periphery of the anode body as in the case of the above-described aspect, this makes the oxidant solution become dry inside the anode body faster than in the outer periphery of the anode body, and accordingly checks the oxidant solution from becoming dry unevenly between the inside and the outer periphery of the anode body. As a result, it is possible to form the conducting polymer layer for the dielectric layer inside the anode body sufficiently, and to make the conducting polymer layer thicker, as well as to increase the coverage factor.

It should be noted that any one of an average particle diameter, a model diameter (mode diameter), a median particle diameter and the like may be used to define the particle diameter. The average particle diameter is an average particle diameter of a sufficient amount of metal particles which are extracted from the cross-section or the like of the sintered body. The model diameter is a particle diameter corresponding to the peak in a frequency distribution curve of the particle diameters. The median particle diameter is a particle diameter of the particle in the middle of the total number of extracted particles which are sorted in order of diameter. It is desirable, however, that the median particle diameter may be used from a viewpoint of minimizing the influence of metal particles with extremely large and small particle diameters.

It is desirable that the median metal particles diameter of the first anode portion is not smaller than 0.30 μm, but not larger than 1.00 μm. The setup of the particle diameter makes it possible to make the spaces among the metal particles inside the anode body larger, and thus to decrease the equivalent series resistance (ESR) of the solid electrolytic capacitor. On the other hand, it is desirable that the median-particle-diameter ratio of the particle diameter of the metal particles for the first anode portion to that of the metal particles for the second anode portion be not smaller than 1.17, but not larger than 2.25. The setup of the median-particle-diameter ratio makes it possible to make the spaces among the metal particles in the outer periphery of the anode body in an appropriate size relative to that inside the anode body. This makes it possible to cause the solid electrolytic capacitor to have a larger capacity, and concurrently to cause the same capacitor to have a smaller equivalent series resistance (ESR).

Moreover, it is desirable that the anode body include a third anode portion which is provided in a way that the third anode portion covers the second anode portion, with the particle diameter of the metal particles for the third anode portion being smaller than that of the metal particles for the second anode portion. When it is the case, it is possible to check the surface area of the sintered body from decreasing due to increase in the particle diameter of the metal particles inside the anode body, and concurrently to secure the thickness of the conducting polymer layer sufficiently. As a result, the solid electrolytic capacitor is capable of having larger capacity, and concurrently having smaller equivalent series resistance (ESR).

Another aspect of the invention provides a method of manufacturing a solid electrolytic capacitor, which comprises: forming an anode body, the anode body forming step comprising forming a first anode portion by sintering particles of a valve metal, and forming a second anode portion on the first anode portion by use of metal particles whose particle diameter is smaller than that of the metal particles for the first anode portion; forming a dielectric layer by oxidizing surfaces respectively of the first and second anode portions; adhering an oxidant on the dielectric layer by applying an oxidant solution thereto and subsequently drying the oxidant solution thereon; and forming a conducting polymer layer on the dielectric layer by polymerization.

This configuration makes it possible to form the first anode portion and the second anode portion, which covers at least part of the first anode portion, for the solid electrolytic capacitor.

In addition, it is desirable that the method of manufacturing a solid electrolytic capacitor includes the step of forming a third anode portion by use of metal particles, whose particle diameter is smaller than that of the metal particles for the second anode portion. When it is the case, it is possible to form the first anode portion, the second anode portion which covers at least part of the first anode portion, and the third anode portion which covers at least part of the second anode portion, for the solid electrolytic capacitor.

The aspects of invention make it possible to provide the solid electrolytic capacitor having a larger capacity and a smaller equivalent series resistance, as well as the method of manufacturing the solid electrolytic capacitor.

BRIEF DESCRIPTION OF THE DRAWINGS

FIG. 8 is a chart showing an equivalent series resistance (ESR) and average capacity of each of solid electrolytic capacitors according to examples 1 to 7 and comparative examples 1 to 2.

DETAILED DESCRIPTION OF EMBODIMENTS

Now, embodiments of the invention will be described with reference to the accompanying drawings. It is to be noted that the respective drawings show examples, and that the invention shall not be limited only to dimensional ratios and other factors appearing on the drawings. Therefore, concrete dimensions and other factors should be determined in consideration of the following explanation. Moreover, there may be differences between the respective drawings in light of dimensional relations and proportions.

Prepositions, such as "on", "over" and "above" may be defined with respect to a surface, for example a layer surface, regardless of that surface's orientation in space. Preposition "above" may be used in the specification and claims even if a layer is in contact with another layer. Preposition "on" may be used in the specification and claims when a layer is not in contact with another layer, for example, there is an intervening layer between them.

First Embodiment

Figure 1A:
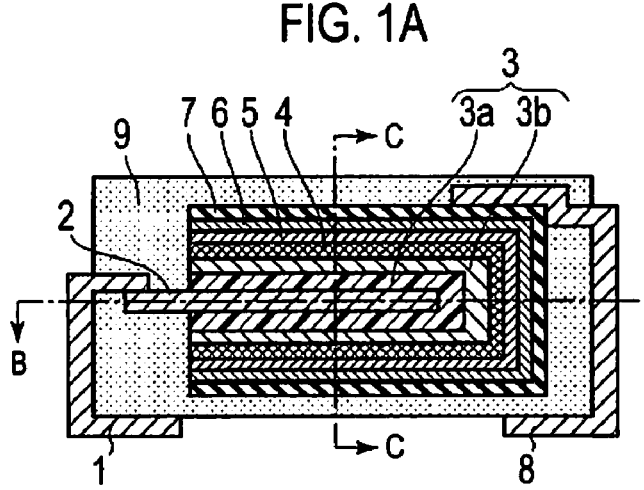
FIG. 1A is a cross-sectional structural diagram of a solid electrolytic capacitor according to a first embodiment.
Figure 1C:
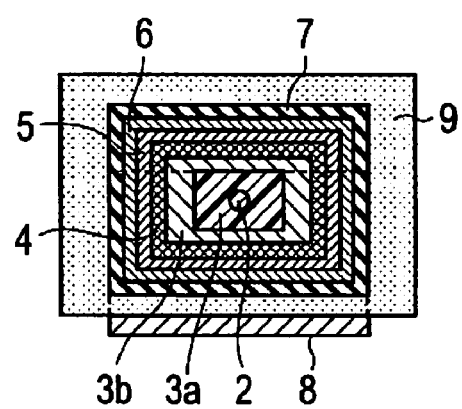
FIG. 1C is a cross-sectional view of the solid electrolytic capacitor taken along the C-C line of FIG. 1A.
Figure 1B:
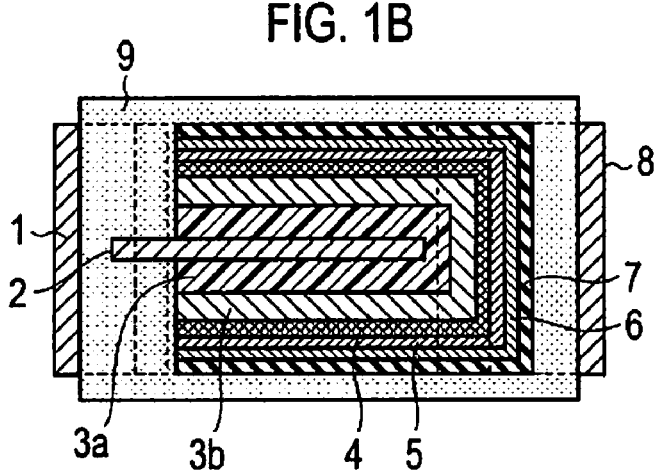
FIG. 1B is a cross-sectional view of the solid electrolytic capacitor taken along the B-B line of FIG. 1A.
Figure 6:
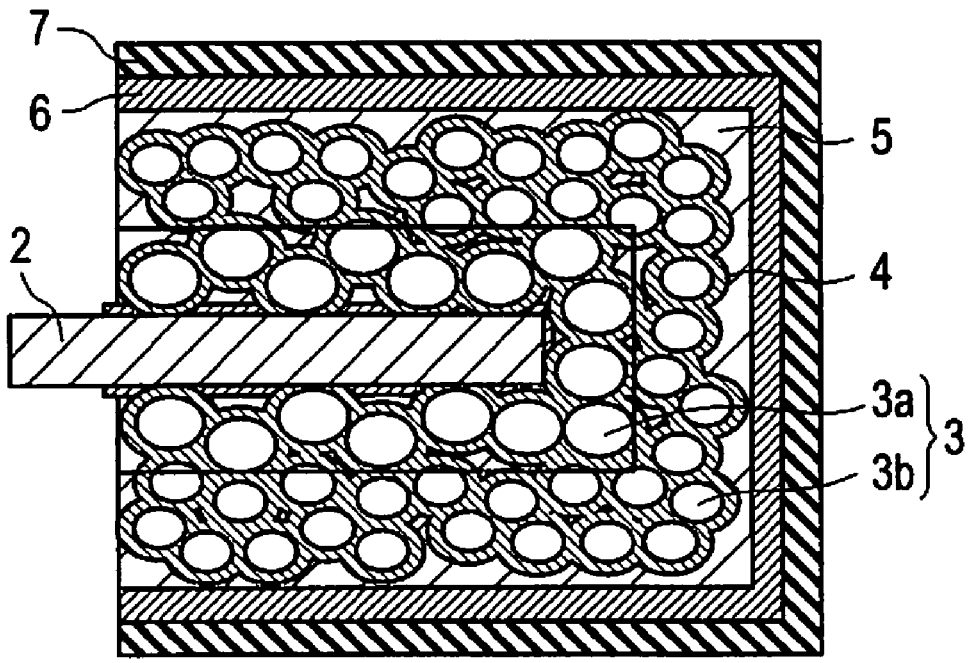
FIG. 6 is a schematic diagram of an enlarged cross-section of an anode body according to the first embodiment.
Figure 7:
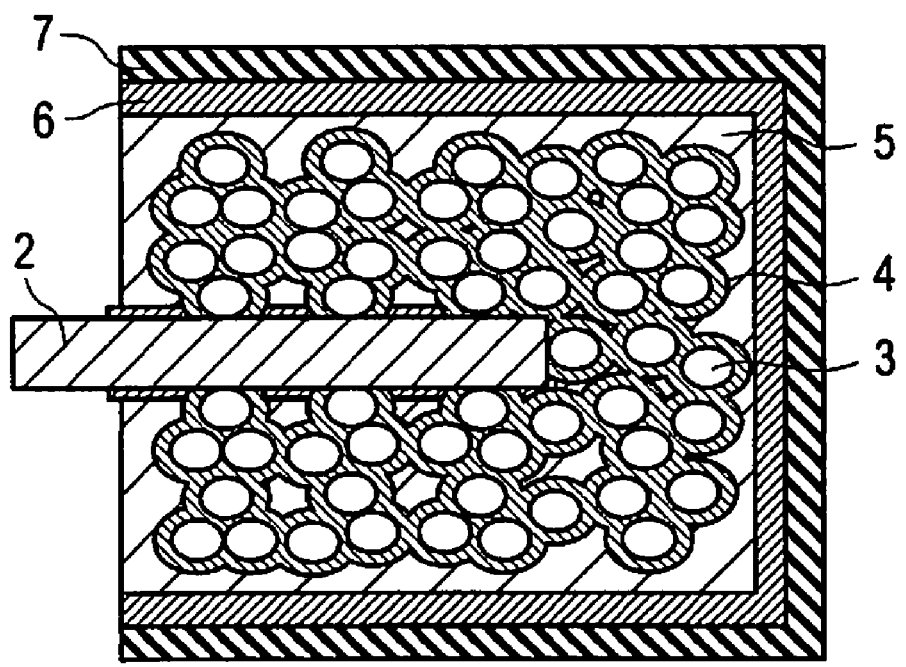
FIG. 7 is a schematic diagram of an enlarged cross-section of an anode body according to the related art.

FIG. 1A is a cross-sectional structural diagram of a solid electrolytic capacitor according to a first embodiment. FIG. 1B is a cross-sectional view of the solid electrolytic capacitor taken along the B-B line of FIG. 1A. FIG. 1C is a cross-sectional view of the solid electrolytic capacitor taken along the C-C line of FIG. 1A. FIG. 6 is a schematic diagram of an enlarged cross-section of an anode body. Descriptions will be provided hereinbelow for the solid electrolytic capacitor according to the first embodiment by use of FIGS. 1 and 6.

In the solid electrolytic capacitor according to the present embodiment, as shown in FIG. 1, anode lead 2 is made of a valve metal, and is embedded in anode body 3. Anode body 3 includes: first anode portion 3a located around anode lead 2; and second anode portion 3b covering the first anode portion.

Descriptions will be provided for the internal structure of anode body 3 by use of FIG. 6. First anode portion 3a, which has cuboid shape, is formed around anode lead 2 and is obtained by sintering particles of a valve metal, and casting the sinter into a mold, in vacuum.

In this respect, valve metals may be used for anode lead 2 and anode body 3. The valve metals may be metallic materials from which insulating oxide films can be formed. Examples of the valve metals include titanium, tantalum, aluminum, niobium, hafnium, zirconium, zinc, tungsten, bismuth and antimony. Porous sintered body can be obtained for anode body 3 by sintering particles of these metals. Out of these metals, titanium, tantalum, aluminum and niobium may be used as materials for anode body 3. Dielectric constants of their oxides are higher, and their raw materials are easily obtained. Particularly, niobium is desirable as a material for anode body 3. The dielectric constant of niobium oxide is 1.5 times as high as that of tantalum oxide.

In addition, alloys of metals selected from a group consisting of the above-mentioned valve metals may be used for anode lead 2 and anode body 3 as well. Any alloy of at least one metal selected from the group consisting of the above-mentioned valve metals and other metals or the like can be used for anode lead 2 and anode body 3. In the case where this type of alloy is used for anode lead 2 and anode body 3, it is desirable that a composition ratio of the valve metal in the alloy may be not smaller than 50%.

Figure 3:
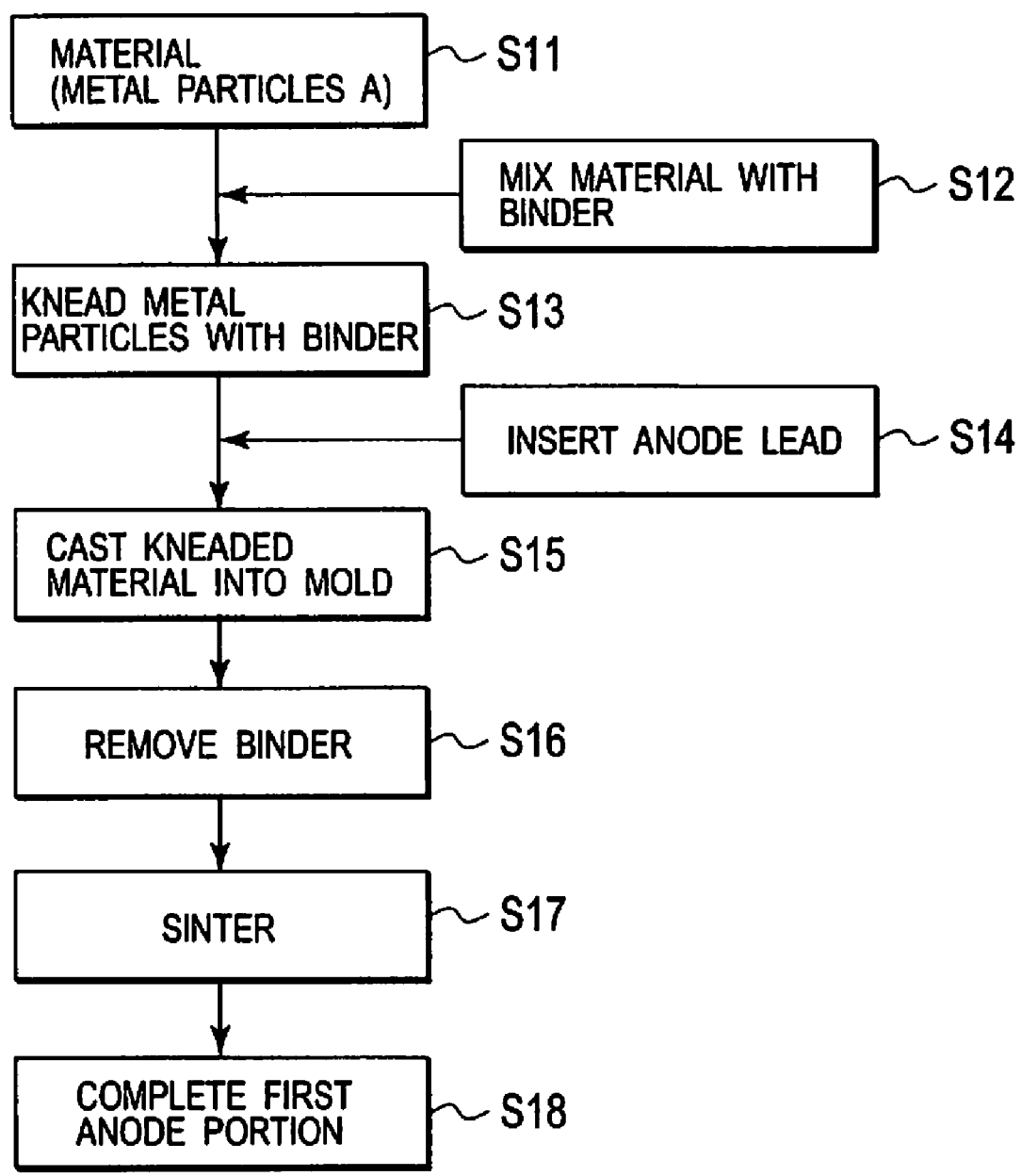
FIG. 3 is a flowchart of a process of manufacturing a first anode portion according to the embodiments.

FIG. 3 shows a flowchart of a process of manufacturing first anode portion 3a. Descriptions will be provided hereinbelow for the manufacturing process by use of FIG. 3. Metal particles A are made of a valve metal as the material (in step S11). Metal particles A are mixed with a binder (in step S12). Subsequently, metal particles A and the binder are kneaded fully (in step S13). Anode lead 2 is inserted into the kneaded metal particles (in step S14). The kneaded particles and anode lead 2 are introduced into a mold, and are thus shaped (in step S15). The binder is removed from the resultant under low pressure (in step S16). The resultant is heated at high temperature, and the metal particles therein are sintered (in step S17). Thereby, first anode portion 3a is formed (in step S18).

It is desirable that the median metal particles diameter of the first anode portion is not smaller than 0.08 μm, but not larger than 1.00 μm. When the particle diameter is smaller than 0.08 μm, the metal particles are densely packed together, and the dense pack limits the space in which the cathode film can be formed. This is likely to reduce the coverage factor of the cathode, and accordingly to decrease the utilization factor of the capacity of the solid electrolytic capacitor. On the other hand, when the particle diameter is larger than 1 μm, the metal particles decrease in number. This is likely to reduce the surface area, and accordingly to decrease the utilization factor of the capacity of the solid electrolytic capacitor. Particularly for the purpose of obtain a higher capacity, it is desirable that metal particles with a particle diameter of 0.2 μm to 0.5 μm be used for the first anode portion. In addition, polyvinyl alcohol (PVA), polyvinyl butyral, polyvinyl acetate or a mixture of an acrylic resin and an organic solvent may be used as the binder to be mixed with the metal particles. It is desirable that the temperature for the sintering be 900° C. to 1300° C. When the temperature is lower than 900° C., it is likely that the metal particles may be sintered insufficiently. On the other hand, the use of higher temperature than 1300° C. is likely to cause the surface area to decrease, because the metal particles are sintered to an excessive degree so that holes decrease in number.

Figure 4:
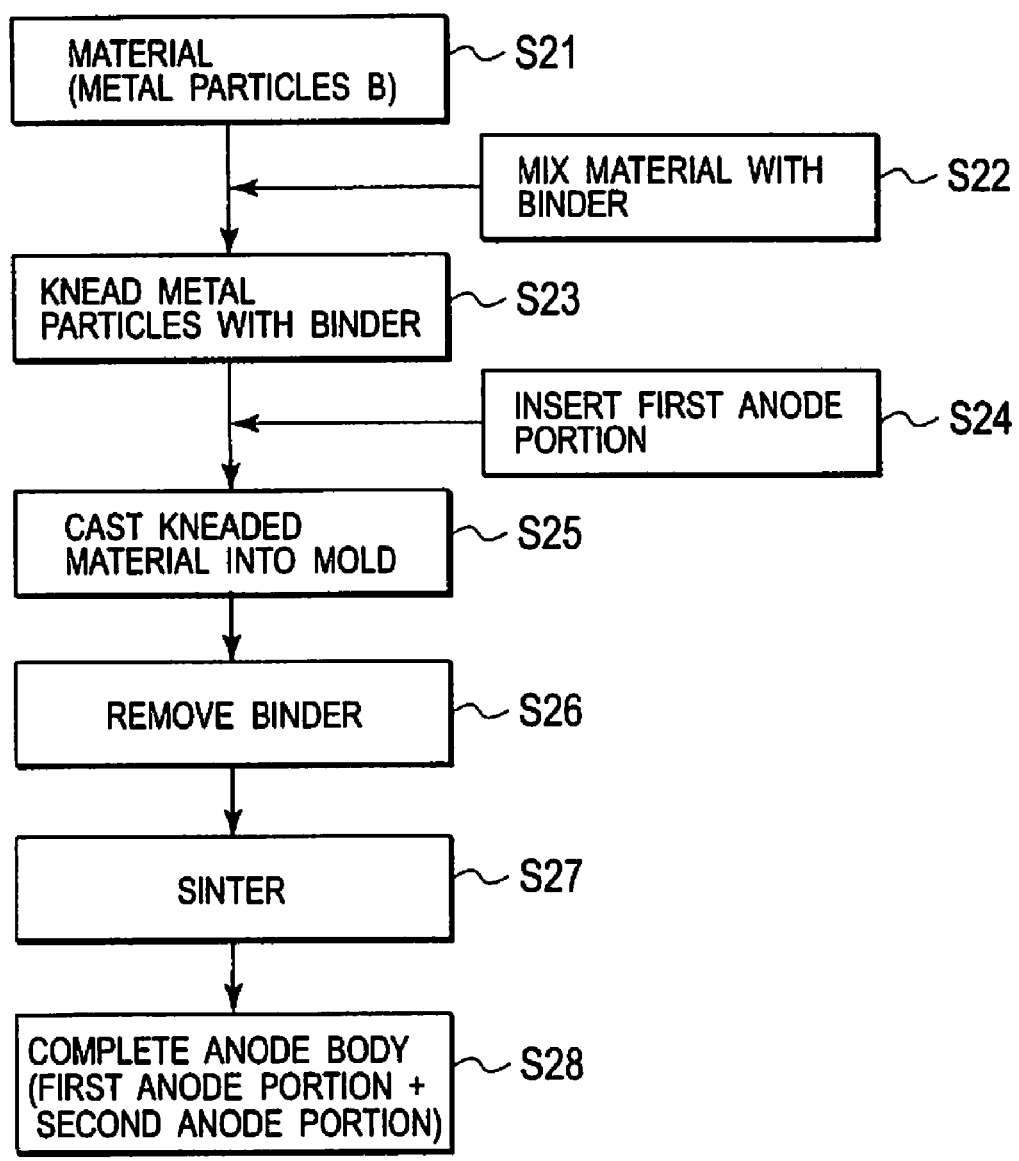
FIG. 4 is a flowchart of a process of manufacturing a second anode portion according to the embodiments.
Figure 5A:
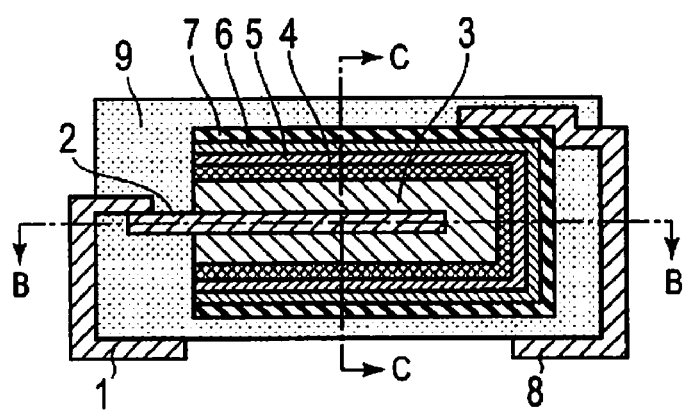
FIG. 5A is a cross-sectional structural diagram of a solid electrolytic capacitor according to the related art.
Figure 5C:
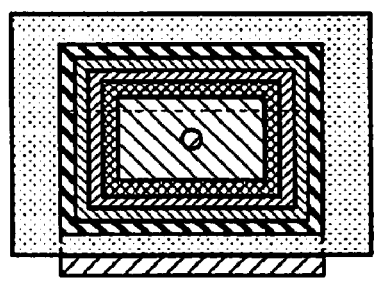
FIG. 5C is a cross-sectional view of the solid electrolytic capacitor taken along the C-C line of FIG. 5A.
Figure 5B:
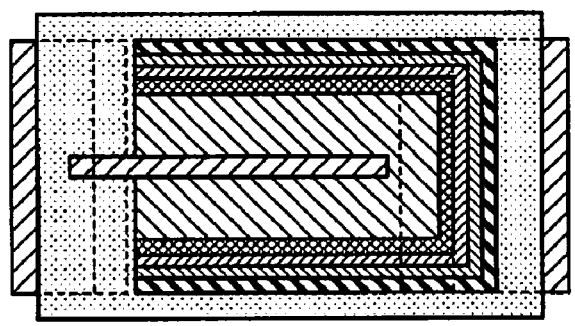
FIG. 5B is a cross-sectional view of the solid electrolytic capacitor taken along the B-B line of FIG. 5A.

FIG. 4 shows a flowchart of a process of manufacturing second anode portion 3b. After first anode portion 3a is formed, second anode portion 3b is formed in a way that second anode portion 3b covers first anode portion 3a. Descriptions will be provided hereinbelow for the manufacturing process by use of FIG. 4. Metal particles B are prepared (in step S21). The particle diameter of metal particles B is smaller than that of the metal particles A used for first anode portion 3a. Subsequently, a binder is mixed with metal particles B (in step S22). Thereafter, metal particles B and the binder are kneaded fully (in step S23). The sintered body made of anode lead 2 and first anode portion 3a, which has been formed in the process shown in FIG. 3, is inserted into the kneaded metal particles (in step S24). After that, the kneaded metal particles as well as the sintered body made of anode lead 2 and first anode portion 3a is introduced into a mold, and is thus shaped (in step S25). Like in the process shown in FIG. 3, the binder is removed from the shaped resultant (in step S26), and the metal particles therein are sintered (in step S27). Thereby, anode body 3 including first anode portion 3a and second anode portion 3b which is formed in a way that second anode portion 3b covers first anode portion 3a can be formed (in step S28).

Dielectric layer 4 made of an oxide of the valve metal is formed on each surface of anode lead 2 and first anode portion 3a. In a case where, for example, the valve metal chiefly contains niobium, dielectric layer 4 is made of niobium oxide.

Dielectric layer 4 is formed by applying an anodic oxidation process to anode lead 2 and anode body 3 in an aqueous solution of phosphoric acid or the like. Thereby, dielectric layer 4 is formed on the surface of the valve metal even inside each of many holes in anode body 3. It is desirable that the film thickness of dielectric layer 4 be in a range of 10 nm to 500 nm. The use of thicker dielectric layer 4 than 500 nm is likely to cause such problems as decrease in the electrostatic capacity and easy detachment of dielectric layer 4 from anode lead 2 and anode body 3. On the other hand, use of thinner dielectric layer 4 than 10 nm is likely to cause the breakdown voltage to decrease, and cause to the leakage current to increase.

Conducting polymer film 5 made of polypyrrole or the like is formed on dielectric layer 4. No specific restriction is imposed on the material for conducting polymer layer 5, as long as a conducting polymer is used as the material for conducting polymer layer 5. Particularly, polypyrrole, polyaniline, polythiophene and the like, which exhibit a better electrical conductivity, may be used as the material.

Conducting polymer layer 5 can be formed, for example, by chemical polymerization. Through the chemical polymerization process, monomers are oxidatively polymerized by use of an oxidant, and thereby conducting polymer layer 5 is formed. More specifically, dielectric layer 4 is formed on each surface of anode body 3 and anode lead 2, and the anode body 3 is thereafter dipped into the oxidant solution. Thereby, the oxidant is adhered onto dielectric layer 4. Subsequently, anode body 3 and anode lead 2 onto which the oxidant is adhered is dipped into a solution in which the monomers are solved, or is left in an atmosphere of monomer vapor. Thereby, the monomers are polymerized on the top surface of the dielectric layer 4, and conducting polymer layer 5 is accordingly formed thereon.

The oxidant accelerates the polymerization process of the monomers on dielectric layer 4. If the oxidant dries up completely, the oxidant does not go well. A conventional practice is to use a sintered body made of metal particles with the same particle diameter, and accordingly to polymerize monomers before the outer periphery of anode body 3 dries up completely. This is because the outer periphery of anode body 3 dries up earlier than the inside of the same anode body. As a result, it is likely that the spaces among the metal particles may be filled with the oxidant solution inside anode body 3. If the monomers are polymerized with the spaces among the metal particles being filled with the oxidant solution inside anode body 3, no conducting polymer layer 5 is formed on the top surface of dielectric layer 4. Otherwise, even though conducting polymer layer 5 is formed, its film thickness is thinner than necessary. These decrease the coverage factor of the conducting polymer layer 5.

With this taken into consideration, in the case of the embodiment, the particle diameter of the metal particles inside anode body 3 is designed to be larger than that of the metal particles in the outer periphery of anode body 3. This design dries the oxidant inside anode body 3 faster than the oxidant in the outer periphery of the same anode body. This resultantly checks the oxidant from drying unevenly between the inside and the outer periphery of anode body 3. As a result, it is possible to form conducting polymer layer 5 on the top surface of dielectric layer 4 even inside anode body 3, and concurrently to make conducting polymer layer 5 thicker, as well as accordingly to increase the coverage factor. In addition, because the spaces among the metal particles can be made larger in anode body 3, conducting polymer layer 5 with a sufficiently-increased thickness can be achieved.

The increased thickness of conducting polymer layer 5 inside the anode body makes it possible to decrease the resistance of conducting polymer layer 5 inside the anode body, the conducting polymer layer 5 being located away from carbon layer 6 and silver layer 7 which are electrically connected to the cathode terminal.

This makes it possible to decrease the resistance value of conducting polymer layer 5 as a whole, and accordingly to decrease the equivalent series resistance (ESR). Furthermore, this increases the coverage factor, and accordingly increases the capacity.

After conducting polymer layer 5 is formed, carbon paste is applied onto conducting polymer layer 5, and the applied carbon paste is dried. Thereby, carbon layer 6 including a layer containing carbon particles is formed on the conducting polymer layer 5. Subsequently, silver paste is applied onto carbon layer 6, and the applied silver paste is dried. Thereby, silver layer 7 including a layer containing silver particles is formed on carbon layer 6.

Cathode terminal 8, which is plate-shaped, is electrically connected to the top of silver layer 7 by use of an electrically-conductive adhesive. Anode terminal 1, which is plate-shaped, is electrically connected to anode lead 2 by spot welding. It is possible to reduce resistance loss in each of anode terminal 1 and cathode terminal 8 by expanding the width of each terminal approximately up to the width of anode body 3. With each part of anode terminal 1 and cathode terminal 8 being drawn out as shown in FIG. 1, outer package 9 made of the epoxy resin or the like is formed by injection molding or the like. An electrically-conductive material such as nickel may be used as the material for anode terminal 1 and cathode terminal 8. Extremities respectively of anode terminal 1 and cathode terminal 8 exposed from outer package 9 are bent, and is thus caused to function as the terminals of the solid electrolytic capacitor.

The following method may be used to measure the median particle diameter in the case of the embodiment. After sintered, the cross-section of the sintered body is observed by use of a SEM (scanning electron microscope). Subsequently, an image process is applied to an image obtained from the observation by use of an image process software such as "A-zou Kun", a product of Asahi Kasei Engineering Corporation. Thereby, circle equivalent diameters (each equivalent to a diameter of a complete circle having the same area as that of the corresponding particle) are found. The circle equivalent diameters thereof are sorted out in the order of size. The particle diameter of a particle ranked in the middle of the particles thus sorted out in the order of size is defined as the median particle diameter.

The scale factor of the SEM photograph of the cross-section of the sintered body, which is used for the diameter measurement, is adjusted in order that particles included in the SEM photograph can be approximately 1000 in number.

Second Embodiment

Figure 2A:
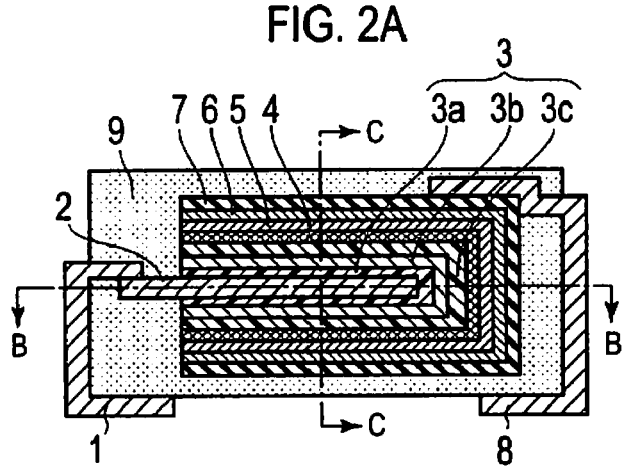
FIG. 2A is a cross-sectional structural diagram of a solid electrolytic capacitor according to a first embodiment.
Figure 2C:
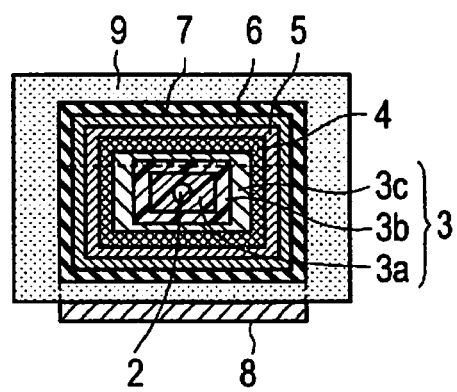
FIG. 2C is a cross-sectional view of the solid electrolytic capacitor taken along the C-C line of FIG. 2A.
Figure 2B:
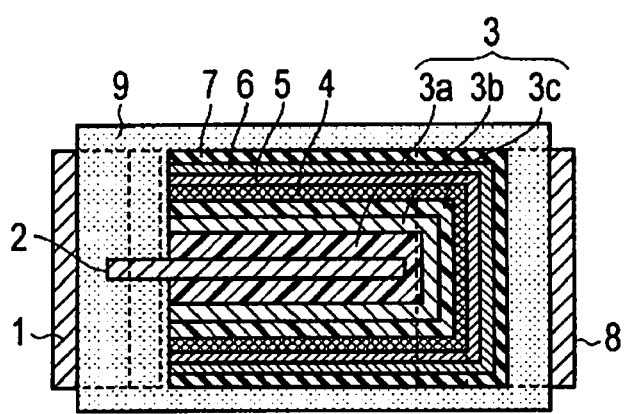
FIG. 2B is a cross-sectional view of the solid electrolytic capacitor taken along the B-B line of FIG. 2A.

FIG. 2A is a cross-sectional structural diagram of a solid electrolytic capacitor according to a second embodiment. FIG. 2B is a taken along the B-B line of FIG. 2A. FIG. 2C is taken along the C-C line of FIG. 2A. The configuration of the solid electrolytic capacitor according to the second embodiment is the same as that of the solid electrolytic capacitor according to the first embodiment, except that anode body 3 includes first anode portion 3a, second anode portion 3b and third anode portion 3c as shown in FIGS. 2A, 2B and 2C. Third anode portion 3c may be provided in a way that third anode portion 3c covers at least part of second anode portion 3b.

The step of forming third anode portion 3c is as follows. Metal particles C, whose particle diameter is smaller than that of metal particles B used for second anode portion 3, are mixed with a binder. Along with the sintered body made of anode lead 2, first anode portion 3a and second anode portion 3b, which is formed in the process shown in FIG. 4 (in step S28), the mixed matter is subsequently introduced into a mold. After that, the binder is removed, and metal particles C are sintered, as in the case of the first embodiment. Thereby, anode body 3 including first anode portion 3a, second anode portion 3b and third anode portion 3c can be formed.

First anode portion 3a, second anode portion 3b and third anode portion 3c are formed in this sequence from the inside to the surface of anode body 3 with the particle diameter diminishing, from the first to third anode portions 3a to 3c in this sequence. For this reason, the spaces among the metal particles also diminish, from the first to third anode portions 3a to 3c in this sequence. As a result, the second embodiment makes it possible to check more completely the surface area of the sintered body from decreasing due to increase in the particle diameter of the metal particles inside the anode body, in comparison with the first embodiment, and concurrently to secure the thickness of the conducting polymer layer sufficiently. Accordingly, the solid electrolytic capacitor with high capacity and low equivalent series resistance can be achieved.

Note that the configuration of anode body 3 according to the present invention is not limited to the configuration of anode body 3 according to the first embodiment including the two anode portions or to the configuration of anode body 3 according to the second embodiment including the three anode portions. For example, the configuration may include four, five or six anode portions. In addition, the configuration of anode body 3 according to the embodiment may further include one or more anode portions which cover at least part of second anode portion 3b or third anode portion 3c.

Moreover, anode body 3 may use a configuration in which particle diameters of the metal particles constituting the sintered body continuously decrease from the center portion to the outer periphery of anode body 3.

Descriptions will be provided hereinbelow for example 1 by use of FIGS. 3 and 4. Metal particles A of niobium are prepared as the material (in step S11). Metal particles A and the binder (the mixture of the acrylic resin and the organic solvent) are kneaded and the kneaded metal particles are prepared (in step S13). Along with a metallic tantalum wire with a diameter of 0.5 mm to serve as anode lead 2, metal particles A kneaded with the binder are shaped into a cuboid with a size of 4.0 mm×2.5 mm×0.8 mm by use of the mold (in step S15). The binder is removed from the resultant metal particles in vacuum (in step S16), and metal particles A is sintered at a temperature of 1100° C. (in step S17). Thereby, first anode portion 3a with a median particle diameter of 0.45 µm is fabricated (in step S18).

Subsequently, metal particles B of niobium are prepared (in step S21). Thereafter, metal particle B are kneaded with a binder (a mixture of an acrylic resin and an organic solvent), and thus kneaded metal particles are prepared (in step S23). Along with the first anode portion, the kneaded metal particles are shaped in a size of 4.5 mm×3.3 mm×1.0 mm by use of a mold (in step S25). After that, the binder is removed from the resultant metal particles in vacuum (in step S26), and the metal particles are sintered at a temperature of 1100° C. (in step S27). Thereby, second anode portion 3b with a median particle diameter of 0.20 µm is fabricated, and anode body 3 including first anode portion 3a and second anode portion 3b is fabricated (in step S28).

Dielectric layer 4 is formed on the top surface of anode body 3 thus fabricated, which is porous, by anodic oxidation (in chemical conversion). Thereafter, by chemical polymerization, conducting polymer layer 5 made of polypyrrole is formed on the top of dielectric layer 4 which has been formed on the top surface of the sintered particles of porous anode body 3 by chemical conversion. Carbon layer 6 and silver layer 7 are formed on the top of conducting polymer layer 5, and thereby the capacitor element is fabricated. The anode terminal and the cathode terminal are respectively attached to anode lead 2 and silver layer 7 of this capacitor element. Thereafter, the capacitor element is covered with a resin by injection molding, and thereby an intended external shape is given to the resultant capacitor element. By this, the solid electrolytic capacitor having the configuration shown in FIG. 1 is completed.

Example 2

Example 2 is the same as example 1 except that the median particle diameter of the metal particles for second anode portion 3b is 0.30 µm.

Example 3

Example 3 is the same as example 1 except that the median particle diameter of the metal particles for second anode portion 3b is 0.35 µm.

Example 4

Example 4 is the same as example 1 except that the median particle diameter of the metal particles for first anode portion 3a is 0.35 µm, and except that the median diameter of the metal particles for second anode portion 3b is 0.20 µm.

Example 5

Example 5 is the same as example 1 except that the median particle diameter of the metal particles for first anode portion 3a is 0.35 µm, and except that the median diameter of the metal particles for second anode portion 3b is 0.30 µm.

Example 6

Example 6 is the same as example 1 except that the median particle diameter of the metal particles for first anode portion 3a is 0.30 µm, and except that the median diameter of the metal particles for second anode portion 3b is 0.20 µm.

Example 7

Third anode portion 3c is fabricated after second anode portion 3b is sintered, in a way that the median particle diameter of the metal particles for first anode portion 3a is 0.45 μm, the median particle diameter of the metal particles for second anode portion 3b is 0.30 μm, and the median particle diameter of the metal particles for third anode portion 3c is 0.20 μm, as well as in a way that the first anode portion is shaped with a size of 3.5 m×2.2 mm×0.7 mm, the second anode portion is 4.0 mm×2.5 mm×0.8 mm, and the third anode portion is 4.5 mm×3.3 mm×1.0 mm. Example 7 is the same as example 1 except for the rest of the configuration and the rest of the manufacturing process.

Comparative Example 1

Anode body 3 with a median particle diameter of 0.20 μm is formed in a size of 4.5 mm×3.3 mm×1.0 mm by using metal particles of niobium as the material for the anode body. Comparative example 1 is the same as example 1 except for the rest of the configuration and the rest of the manufacturing process (see FIG. 3).

Comparative Example 2

Anode body 3 with a median particle diameter of 0.45 μm is formed in a size of 4.5 mm×3.3 mm×1.0 mm by using metal particles of niobium as the material for the anode body. Comparative example 2 is the same as example 1 except for the rest of the configuration and the rest of the manufacturing process (see FIG. 3).

(Evaluation)

FIG. 8 is a chart showing the equivalent series resistance (ESR) and average capacitance of each of the solid electrolytic capacitors according to examples 1 to 7 and comparative examples 1 to 2. Each equivalent series resistance (ESR) shown in this chart is a result obtained by manufacturing 100 solid electrolytic capacitors for each of examples 1 to 7 and comparative examples 1 to 2 and by finding the equivalent series resistance (ESR) from each 100 solid electrolytic capacitors at a frequency of 100 kHz by use of a LCR (inductance-capacitance-resistance) meter. Each capacitance shown in this chart is obtained by measuring the capacitances of the aforementioned 100 solid electrolytic capacitors at a frequency of 120 kHz by use of the same LCR (inductance-capacitance-resistance) meter, as well as accordingly finding the average capacitance for each 100 solid electrolytic capacitors.

As learned from FIG. 8, the average ESR obtained in each case where the ratio of the particle diameter of the metal particles for first anode portion 3a and that of the metal particles for second anode portion 3b is larger than one, particularly in a case where the particle diameter ratio is in a range of 1.17 to 2.25, is lower than the average ESR obtained in comparative example 1 where metal particles with a particle diameter 0.20 μm, which is the smallest in examples 1 to 7 and comparative examples 1 to 2, are used for anode body 3. On the other hand, the average capacitance obtained in the same case is higher than that obtained in comparative example 1.

It is considered that the formation of thicker conducting polymer layer 5 in first anode portion 3a decreases the value representing the resistance of conducting polymer layer 5 as a whole, eventually leading to such lower average equivalent series resistance (ESR). In addition, it is also considered that the even drying of the oxidant allows conducting polymer layer 4 to be formed even inside first anode portion 3a, to thereby increase the coverage factor, resulting in such lower average equivalent series resistance.

Furthermore, the reason why the average equivalent series resistances (ESRs) of examples 2 and 3 in each of which the particle diameter of the metal particles for second anode portion 3b is larger than that in example 1 is considered to be as follows. The larger ratio of the particle diameter of the metal particles for first anode portion 3a to that for second anode portion 3b enables the oxidant to dry evenly so that conducting polymer layer 5 is formed thicker inside first anode portion 3a.

As shown in example 7, in a case where third anode portion 3c is added to anode body 3, the average equivalent series resistance (ESR) can further decrease. By contrast, the average equivalent series resistance (ESR) in comparative example 2, in which anode body 3 is formed by use of metal particles with a larger particle diameter, is lower than that in comparative example 1. However, the average capacitance in comparative example 2 is far lower than that of each of examples 1 to 7 and comparative example 1.

As described above, the solid electrolytic capacitor according to the embodiment is capable of having a lower equivalent series resistance, so that the solid electrolytic capacitor can be applied to power supply circuits for not only various electronic appliances such as personal computers and video apparatuses but also mobile appliances typical of cellular phones and potable music players.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

What is claimed is:

1. A solid electrolytic capacitor, comprising:
an anode lead partially embedded in the anode body:
an anode body including a sintered body made of metal particles comprising: a first anode portion disposed around the anode lead; and a second anode portion disposed around the anode lead and the first anode portion covering the first anode portion, the particle diameter of metal particles of the second anode portion being smaller than that of the metal particles for the first anode portion;
a dielectric layer provided over the anode body; and
a conducting polymer layer provided over the dielectric layer.

2. The solid electrolytic capacitor of claim 1, wherein the median metal particles diameter of the first anode portion is not smaller than 0.08 μm, but not larger than 1.00 μm.

3. The solid electrolytic capacitor of claim 1, wherein the median metal particles diameter of the first anode portion is not smaller than 0.30 μm, but not larger than 1.00 μm.

4. The solid electrolytic capacitor of claim 1, wherein a median-particle-diameter ratio of the particle diameter of the metal particles for the first anode portion to the particle diameter of the metal particles for the second anode portion is not smaller than 1.17, but not larger than 2.25.

5. The solid electrolytic capacitor of claim 1, wherein the anode body further comprises a third anode portion provided covering the second anode portion, a particle diameter of metal particles of the third anode portion being smaller than that of the metal particles for the second anode portion.

6. The solid electrolytic capacitor of claim 1, wherein the metal particles are valve metals.

7. The solid electrolytic capacitor of claim 6, wherein the metal particles are made of any one metal selected from the group consisting of titanium, tantalum, aluminum, niobium, hafnium, zirconium, zinc, tungsten, bismuth and antimony.

8. The solid electrolytic capacitor of claim 6, wherein the metal particles are made of an alloy containing at least two selected from the group consisting of titanium, tantalum, aluminum, niobium, hafnium, zirconium, zinc, tungsten, bismuth and antimony.

9. The solid electrolytic capacitor of claim 6, wherein the metal particles are made of an alloy in which a composition ratio of any one selected from the group consisting of titanium, tantalum, aluminum, niobium, hafnium, zirconium, zinc, tungsten, bismuth and antimony is not smaller than 50%.

10. A method of manufacturing a solid electrolytic capacitor comprising: forming an anode body, comprising:
    forming a first anode portion by sintering particles of a valve metal; and
    forming a second anode portion such that the second anode portion covers the first anode portion by use of metal particles whose particle diameter is smaller than that of the metal particles for the first anode portion;
    forming a dielectric layer by oxidizing surfaces respectively of the first and second anode portions;
    adhering an oxidant on the dielectric layer by applying an oxidant solution thereto and subsequently drying the oxidant solution thereon; and
    forming a conducting polymer layer on the dielectric layer by polymerization.

11. The method of claim 10, wherein the forming an anode body further comprises: forming a third anode portion on the second anode portion by use of metal particles whose particle diameter is smaller than that of the metal particles for the second anode portion.

12. The method of claim 10, wherein the median metal particles diameter of the first anode portion is not smaller than 0.08 μm, but not larger than 1.00 μm.

13. The method of claim 10, wherein the median metal particles diameter of the first anode portion is not smaller than 0.30 μm, but not larger than 1.00 μm.

14. The method of claim 10, wherein a median-particle-diameter ratio of the particle diameter of the metal particles for the first anode portion to the particle diameter of the metal particles for the second anode portion is not smaller than 1.17, but not larger than 2.25.

15. The method of claim 10, wherein the metal particles are valve metals.

16. The method of claim 15, wherein the metal particles are made of any one metal selected from the group consisting of titanium, tantalum, aluminum, niobium, hafnium, zirconium, zinc, tungsten, bismuth and antimony.

17. The method of claim 15, wherein the metal particles are made of an alloy containing at least two selected from the group consisting of titanium, tantalum, aluminum, niobium, hafnium, zirconium, zinc, tungsten, bismuth and antimony.

18. The method of claim 15, wherein the metal particles are made of an alloy in which a composition ratio of any one selected from the group consisting of titanium, tantalum, aluminum, niobium, hafnium, zirconium, zinc, tungsten, bismuth and antimony is not smaller than 50%.

* * * * *